Dec. 16, 1930.    H. F. GORSUCH ET AL    1,785,119
LOADER
Original Filed June 5, 1926    5 Sheets-Sheet 1

Howard F. Gorsuch
Arthur S. Hughes
INVENTORS

WITNESSES
BY
ATTORNEY

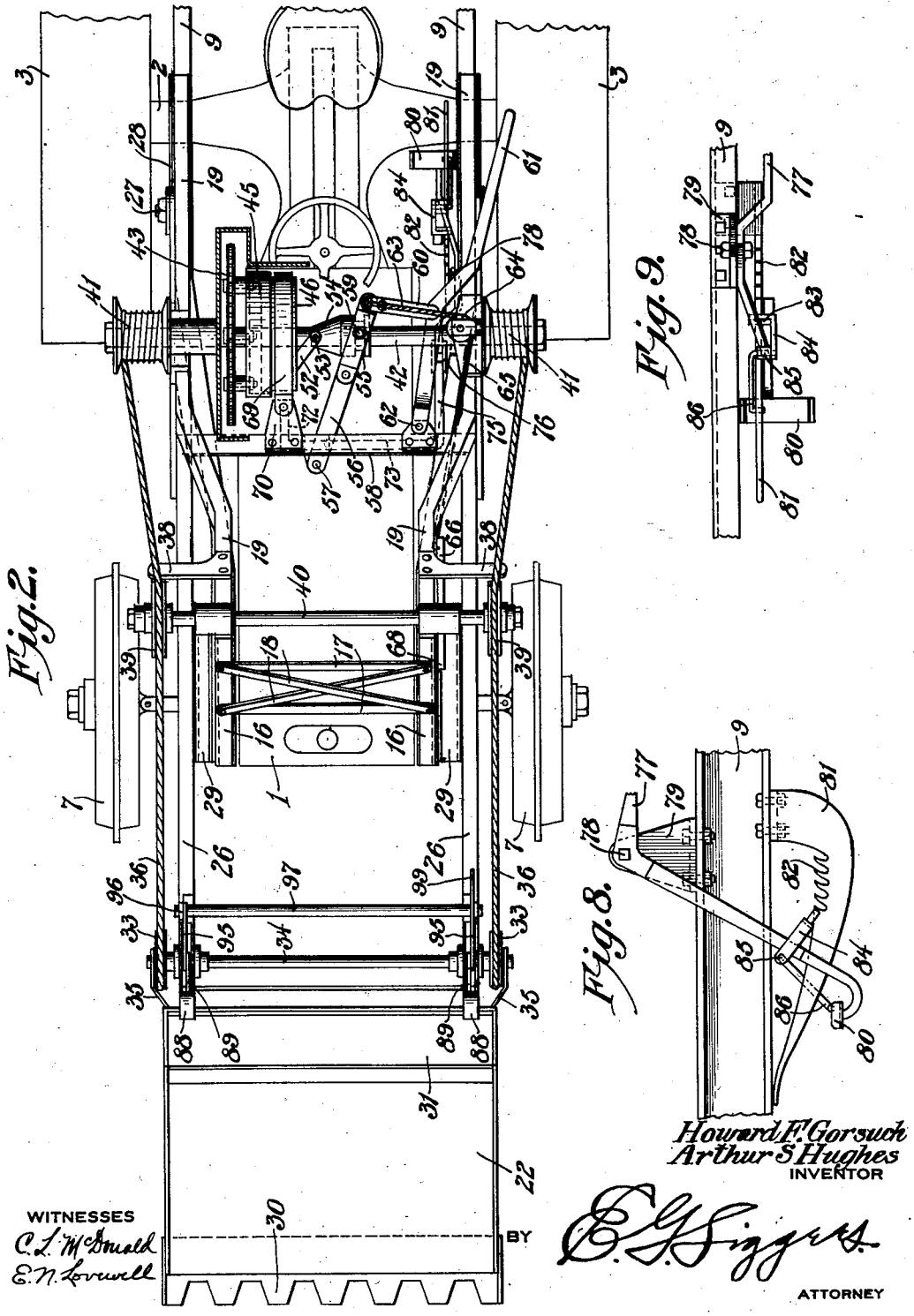

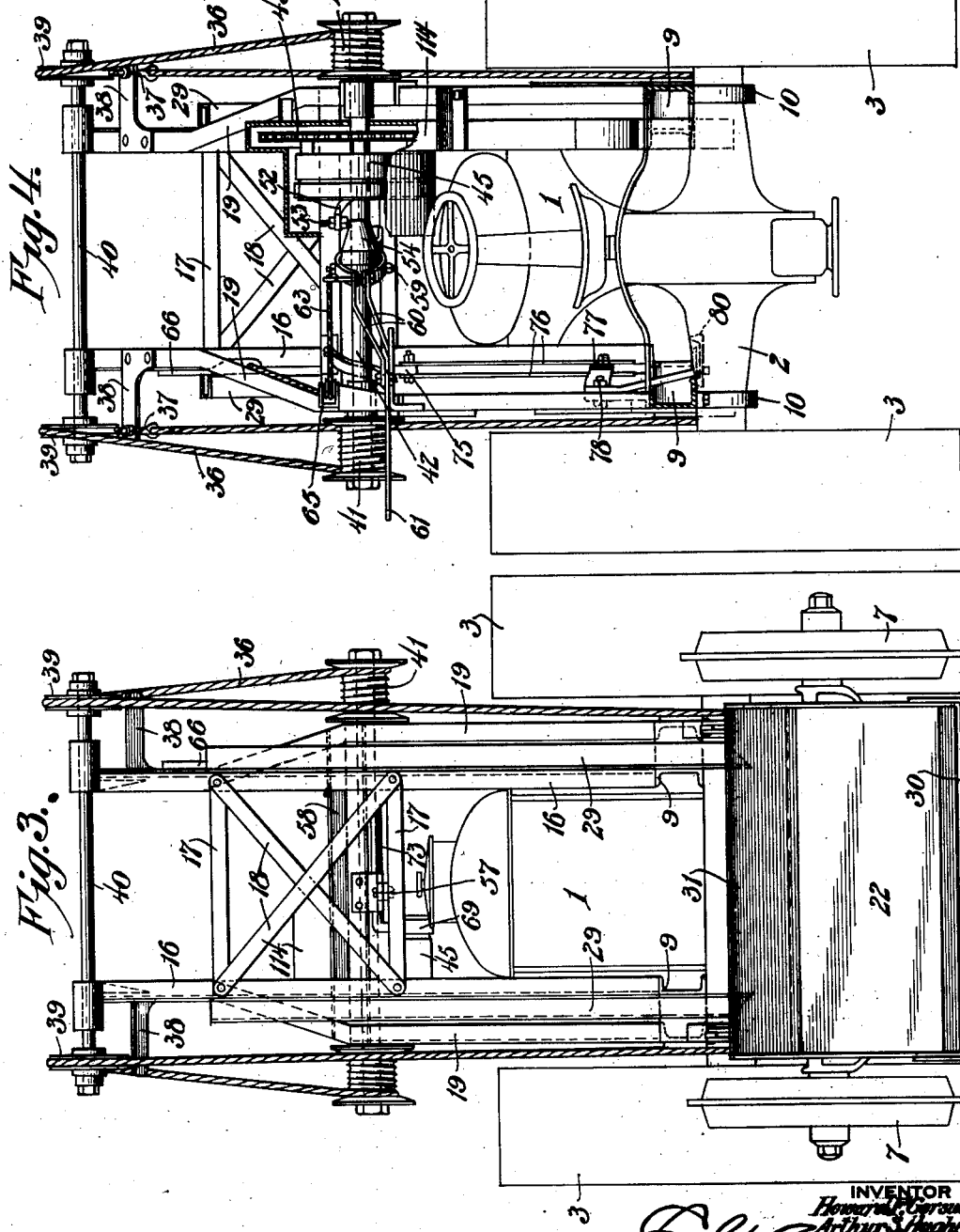

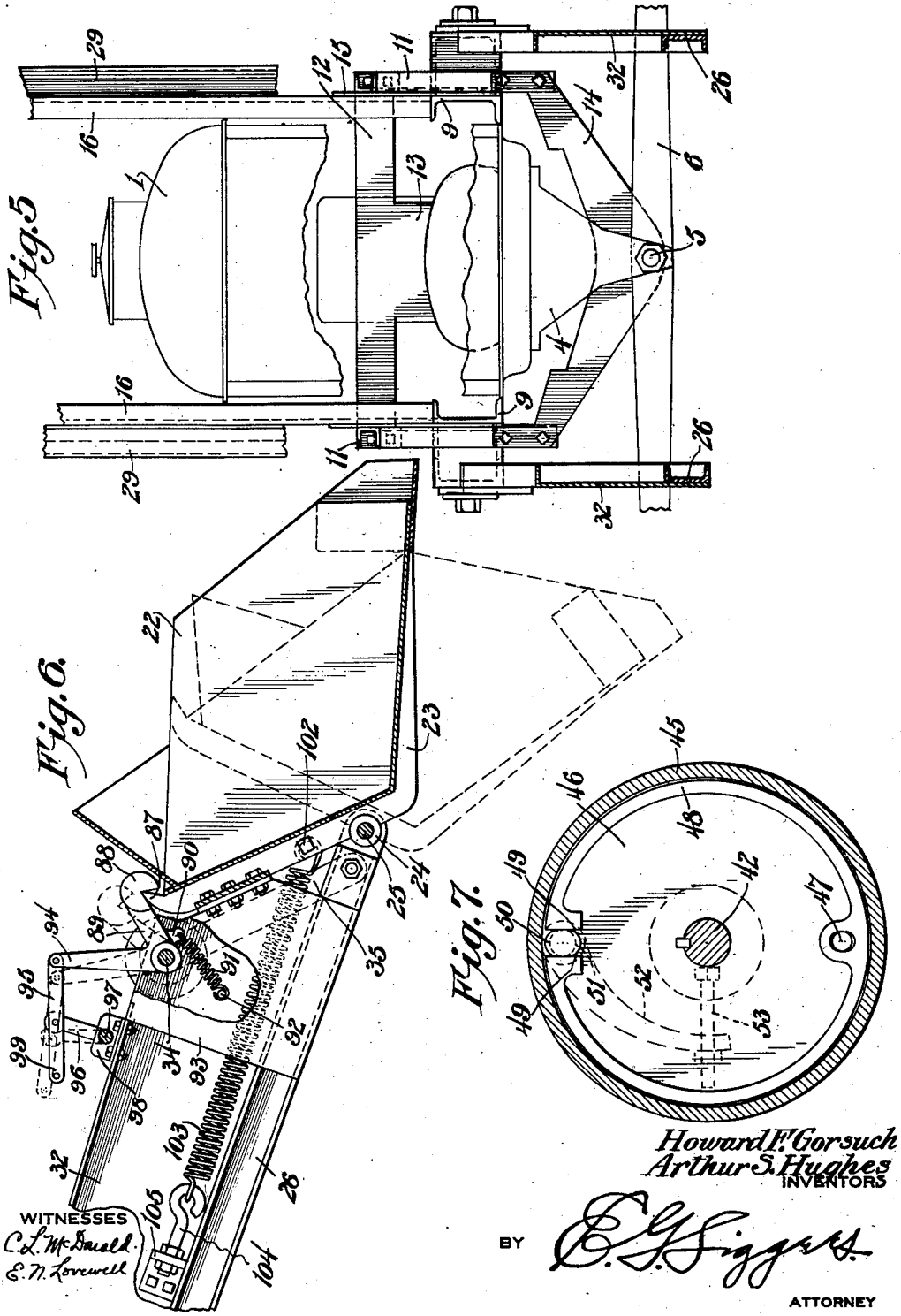

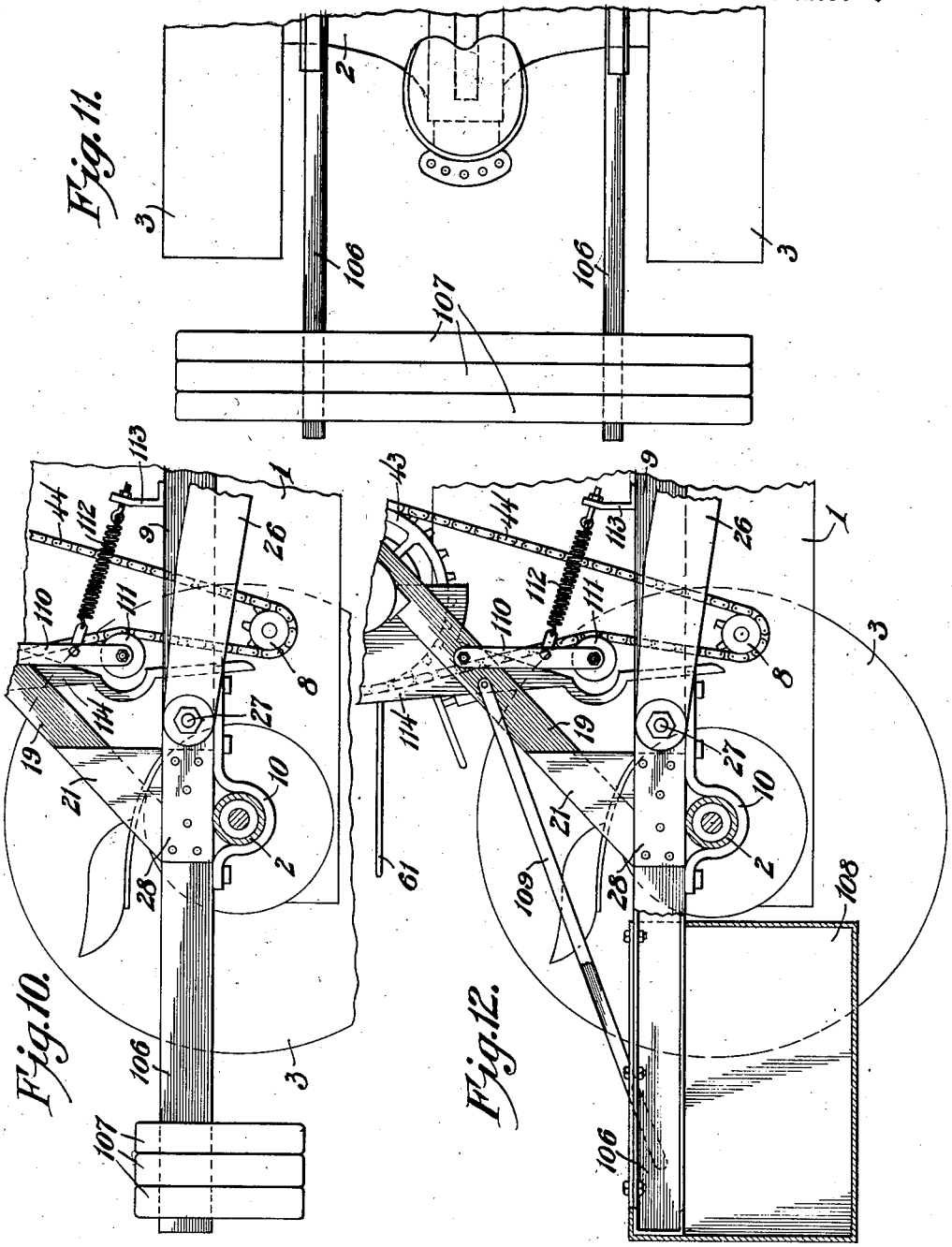

Patented Dec. 16, 1930

1,785,119

UNITED STATES PATENT OFFICE

HOWARD F. GORSUCH AND ARTHUR SHERIDAN HUGHES, OF MANSFIELD, OHIO, ASSIGNORS TO HUGHES-KEENAN COMPANY, OF MANSFIELD, OHIO, A CORPORATION OF OHIO

LOADER

Application filed June 5, 1926, Serial No. 113,962. Renewed May 14, 1930.

This invention relates to a loader adapted to be attached to and supported by a tractor, and operated by the engine of the tractor.

The general object of the invention is to provide an attachment of this character, which is strong and durable in construction, which is easy to operate and control, and which may be easily secured in operative relation to a small tractor of well-known type without any material alteration in the latter.

The above and other improved features will be more fully explained in connection with the accompanying drawings which illustrate the invention in its preferred form, together with certain modifications thereof.

In the drawings:

Figure 2 is a plan view of the same.

Figure 3 is a front elevation.

Figure 4 is a rear elevation with parts broken away.

Figure 5 is a front elevation with parts broken away, in order to show the manner of securing the attachment to the front part of the tractor body.

Figure 6 is a vertical longitudinal section through the bucket and the means supporting the same.

Figure 7 is a detail view of the clutch.

Figure 8 is a side elevation of the foot controlled latch and brake operating means.

Figure 9 is a plan view of the parts shown in Figure 8.

Figure 10 is a side elevation of the rear part of the attachment showing a counterweight for the load, the tractor axle and its housing being shown in section.

Figure 11 is a plan view of the counterweight attachment.

Figure 12 is a view similar to Figure 10, but showing a modification thereof.

Figure 1:
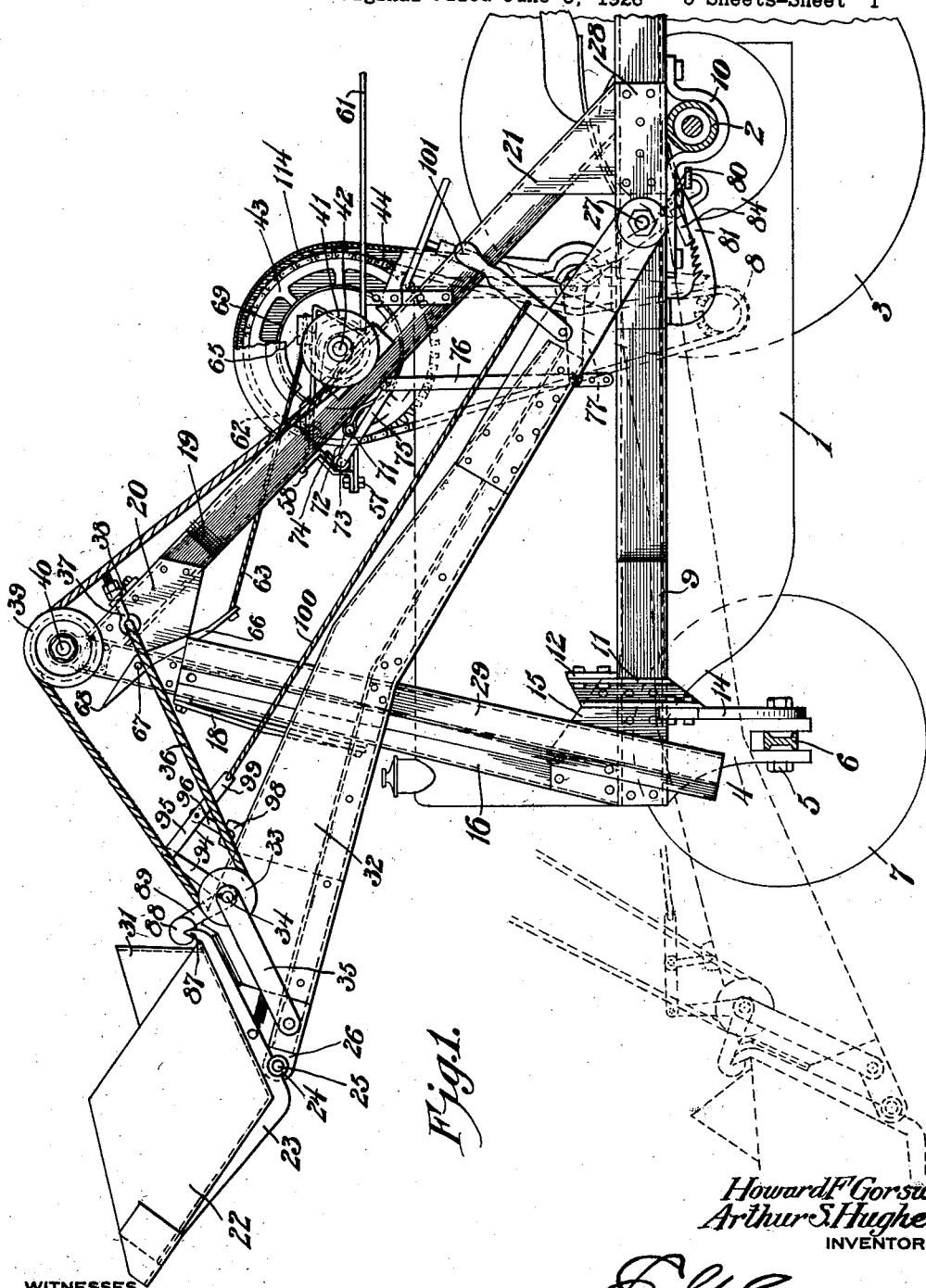
Figure 1 is a side elevation of the invention attached to a tractor, with parts broken away and shown in section.

Referring first to Fig. 1, the preferred embodiment of the invention is shown in connection with a Fordson tractor, having a body portion 1 with a rear axle housing 2 supported by rear wheels 3, and having at its front end a yoke 4 connected by a pivot bolt 5 to a front axle tree 6, which is supported by front wheels 7. The tractor is provided on one side with a sprocket wheel 8, which is driven from the tractor engine, and from which power may be taken.

The loader comprises a frame with side rails 9, in the form of channel bars, the rear ends of which rest on the rear axle housing 2, and are secured thereto by stirrups 10. Upright channel pieces 11 are secured to the side rails 9 near their front ends, and are connected by a cross bar 12 (Fig. 5), the intermediate portion of which is provided with a downward extension 13, which terminates just above the forward end of the timing gear housing. The lower ends of the pieces 11 are connected by a curved plate 14, which is supported on the pivot bolt 5.

Secured to the front end of each side rail 9 is a corner plate 15 to which is secured an upwardly and rearwardly inclined channel bar 16. The two bars 16 are secured in spaced parallel relation by a transverse bar 17 (Fig. 3) and brace bars 18. Each side of the loader frame also has a downwardly and rearwardly inclined channel bar 19 (Figs. 1 and 3), secured to the bars 16 and 9 by corner plates 20 and 21, respectively. The described loader frame consists essentially of two upright triangular frames whose base is the tractor, and which are prevented from moving laterally by the bars 17, 18 and by parts to be described.

The loader includes a scoop 22, of substantial size, which is reinforced on the bottom and rear faces by ribs 23. See Figs. 1 and 6. Each of these ribs is formed with a bearing 24, which receives a pivot pin 25 at the front end of a lifting arm 26, the rear end of which is pivoted at 27 to the side rail 9. The rear ends of the lifting arms 26 are rounded, and bear against the front ends of abutment plates 28 which are secured to the side rails 9 as shown in Figs. 1, 2 and 10, so as to take up the thrust and relieve the strain on the pivots 27.

The lifting arms 26 are substantially parallel to each other, and are guided in their up and down movements by rails 29, which are secured to the outsides of bars 16 (Figs. 1, 2 and 5). A blade 30 with a serrated or toothed edge (Fig. 3) is secured to the front edge of the scoop 22, and a hood 31, to prevent spilling of the material, is secured to its upper rear edge (Figs. 1 and 6). The lifting arms 26 are reinforced by flanged plates 32, and the front ends of the latter also form abutments against which the rear wall of the scoop 22 may engage.

The power for lifting the scoop 22 is applied through sheaves 33, mounted on a transverse shaft 34, adjacent the outer ends of the plates 32. The shaft 34 is connected with arms 26 by links 35. At each side a cable 36, passing about the sheave 33, has one end secured to an eye bolt 37, which is supported for rocking movement in a plate 38 (Fig. 4) secured to the upper part of the frame bar 19. Each cable 36, after passing about the sheave 33, passes over a sheave 39 mounted on a shaft 40 at the top of the loader frame, and passes thence rearwardly and downwardly and about a winding drum 41 (Figs. 1 and 2) mounted on a shaft 42, which is supported transversely of the stationary frame.

The mechanism for driving shaft 42 includes a sprocket wheel 43, rotatable on the shaft 42, and driven by a sprocket chain 44 from the wheel 8. As best shown in Fig. 2, a clutch drum 45 is bolted rigidly to the sprocket wheel 43, and said drum is mounted on the shaft 42 so as to turn independently of said shaft. A brake drum 46 is keyed to the shaft 42, adjacent the clutch drum 45. Projecting inwardly from the drum 46 is a pin 47 (Fig. 7), on which an expansible band 48 is supported. The ends of this band are formed with opposed faces 49, between which is a cam 50 carried by the end of a pin 51. The pin 51 is mounted for rocking movement in the brake drum 46, and has a curved arm 52 (Figs. 2, 4 and 7) with a screw 53 in its outer end, which is adapted to be engaged by the tapered surface of a cone 54, slidably mounted on the shaft 42, so that when the cone is moved inwardly by the operator, the pin 51 and cam 50 are rocked to spread the band 48, thereby causing the latter to engage the inner face of the clutch drum 45, so that the shaft 42 and drums 41 will be rotated to wind up the cables 36, and to lift the scoop.

To permit control of the lifting by the operator, the base of the cone 54 is formed with a peripheral groove 55 (Fig. 2), and a lever 56, fulcrumed at 57 on a cross bar 58 connecting the two bars 19, straddles the cone and carries pins 59, which engage the groove 55 to slide the cone longitudinally of the shaft 42 as the lever 56 is swung laterally. Links 60 connect the free end of the lever 56 to a hand lever 61, which is fulcrumed at 62 on the cross bar 58, and by which the clutch is controlled. A small cable 63 (Figs. 1 and 2) is also connected to the end of the lever 56 and passes over a sheave 64 mounted in a bracket 65 on one of the side bars 19, and the other end of the cable 63 is connected to a lever 66, which is fulcrumed at 67 on the bar 16, and has an end 68 projecting into the path of the swinging frame which carries the scoop. As the scoop reaches its uppermost position, therefore, the lever 66 is rocked, and pulls upon the cable 63 to withdraw the cone 54 from underneath the pin 53, thereby disengaging the clutch automatically. Manual control of the clutch, independent of the automatic clutch release, is also permitted.

As soon as the clutch is disengaged, the cables 36 are prevented from unwinding, (and the scoop is held in elevated position,) by tightening a brake band 69, which surrounds the drum 46. One end of this brake band is connected to an ear 70 (Fig. 2) which is secured to the cross bar 58, and the other end of the band is connected to a crank pin 71 (Fig. 1) on the end of an arm 72, which projects from a rock shaft 73 mounted in brackets 74 beneath the bars 19. The other end of the rock shaft 73 has a crank 75 with a depending link 76 at its outer end, which is adjustably connected to a lever 77, fulcrumed at 78 (Figs. 8 and 9) in a bracket 79, which is secured to one of the bars 9. The other end of the lever 77 is formed with a pedal 80, adapted to be depressed by the foot of the driver when it becomes necessary to apply the brake to hold the scoop with its load in the position to which it has been raised. A latch bar 81 is secured to the bar 9 adjacent the lever 77, and is formed with teeth 82, adapted to be engaged by the hook-shaped end 83 of a latch 84, which is pivoted at 85 to the lever. The other end 86 of the latch extends to one side of the pedal 80, where it may be engaged by the foot of the driver whenever it is desired to disengage the latch. Thus the scoop may be held elevated as long as desired, without taxing the operator.

As shown in Fig. 6, each of the ribs 23 has a pointed end 87 extending above the rear edge of the scoop, and adapted to serve as a keeper to be engaged by a latch 88 formed at the end of a bell crank lever having an arm 89 and being rockable on the shaft 34. An ear 90 depends from the underside of the arm 89, and is connected by a contractile coil spring 91 to a pin 92 on the side of the plate 32, the spring and pin being protected by a housing plate 93. Each bell crank latch lever has another arm 94, which is connected by a link 95 to an arm 96 formed at the end of a rock shaft 97, which is mounted in ears 98 secured to the upper edges of the plates 32. The rock shaft 97 causes simultaneously movement of the two latches. One of the links 95 is extended rearwardly, as shown at 99 (Fig. 1), beyond its pivotal connection with the arm 96, and a line 100 connects the extended portion 99 of the link with a hand lever 101, mounted near the rear end of one of the bars 26, and operable by the driver to unlatch the scoop, which swings about its pivot 25 to discharge its load, as indicated in dotted lines in Fig. 6.

As best shown in Fig. 6, stud bolt 102 is secured in rear of each of the ribs 23 above the pivot 25, and is connected by a strong spring 103 to an eye bolt 104, secured in an ear 105 on the plate 32. These springs 103 are strong enough to hold the scoop in position when empty, but will permit the scoop to tilt when loaded. As soon as the contents of the scoop are discharged, the springs will return it with a bang against the abutting ends of the plates 32, and will jar loose any sticky material which may adhere to the bottom and sides of the scoop.

As shown in Figures 10 and 11, the side bars 9 of the stationary frame are extended rearwardly, as shown at 106, and are adapted to support a number of counter-weights 107. These counter-weights are for the purpose of maintaining sufficient weight on the wheels 3 to insure sufficient traction to force the scoop into the material to be loaded, and may also prevent the tractor from tipping when the scoop is in use, and facilitate steering. The number of counter-weights to be used may vary according to the conditions under which the loader is used.

Under certain conditions, it may be desired to use counter-weights amounting in the aggregate to 1,000 pounds, and in order to save the expense of transporting so much weight, it may be desired to use the modified construction shown in Figure 12. In this form, instead of the weights 107, a box 108 is secured to the rearwardly projecting bars 106, and braces 109 connect the sides of the box with the bars 19. The box 108 may be filled with loose rocks, gravel, or any available material in order to make the desired weight.

A suitable chain tightener may be provided for the sprocket chain 44. As shown in Figs. 10 and 12, this tightener consists of arms 110 pivoted to the adjacent bar 19, and carrying a roller 111, which is held against the chain by a spring 112, connecting the arms 110 with an ear 113 secured to the side bar 9. To protect the operator, a suitable housing 114 may be provided for the sprocket wheel 43, and the other mechanism associated therewith.

In the operation of the loader, the scoop 22 is lowered to the ground, or to the level where it is desired to pick up the load. The tractor is then driven forwardly to fill the scoop, and the lever 61 is then moved to cause the sprocket wheel 43 to be clutched to the shaft 42. The sprocket wheel 43 is constantly driven from the sprocket wheel 8, and will now cause the shaft 42 to rotate, winding the cables 36 about the drums 41, and raising the swinging arms 26 and the scoop carried thereby. When the scoop reaches its uppermost position, the swinging frame will engage the end 68 of the lever 66, and pull upon the cable 63 to throw out the clutch. The load is then supported by depressing the pedal 80, thus causing the brake band 69 to grip the drum 46, which is secured to the shaft 42. The latch 83 will then engage one of the teeth 82 to set the brake, and hold the load in elevated place until it is carried to the position where it is to be unloaded. The load may then be released by pulling upon the line 100 by means of the lever 101. When the tractor has been returned to loading position again, the brake may be released to permit the bucket to lower by gravity by disengaging the latch with the driver's foot, control of the gravity lowering being had through the brake 69 and pedal 80.

While we have shown and described in detail the specific structure and operation of the loader in its preferred form, it is to be understood that the same may be modified to a considerable extent without any material departure from the invention which is defined in the claims.

What is claimed is:

1. An attachment for a tractor comprising a main frame with horizontal side bars adapted to be secured to the rear axle housing of the tractor at opposite sides of the tractor body, a transverse member rigidly connecting the front ends of the side bars and adapted to be supported from the front axle tree of the tractor, inclined bars at each side of the main frame, said inclined bars being disposed in a vertical plane and secured at their lower ends to the side bars and secured at their upper ends to each other, guide rails secured respectively to the front inclined bars, a swinging frame including a pair of arms rigidly connected together and pivoted at their rear ends to the main frame so as to swing upwardly and downwardly, said arms being guided in their swinging movement by said guide rails, means at the forward end of the swinging frame for carrying a load, means for raising the swinging frame about its pivot, and releasable means for retaining the swinging frame in raised position.

2. In a loader, the combination of a relatively stationary frame, a swinging frame including arms pivoted to the stationary frame, a scoop carried at the ends of said arms, cables connected to said arms, drums over which the cables may be wound to lift said arms and scoop, a shaft on which the drums are secured, a driven member rotatably mounted on said shaft, clutch mechanism to operatively connect the driven member to the shaft, a clutch lever connected with the clutch mechanism to connect or disconnect the same, a hand lever, a link connecting the hand lever with the clutch lever for actuating the latter, a lever pivoted to the upper part of the stationary frame and projecting into the path of the swinging frame, a cable connecting said last-mentioned lever to the clutch lever, whereby to automatically disconnect the clutch mechanism as the swinging frame and scoop reach their uppermost position, and releasable means for retaining the swinging arms and scoop in elevated position when the clutch mechanism has been disconnected.

3. In a loader, the combination of a relatively stationary frame including substantially horizontal side bars adapted to be secured at opposite sides of a tractor, inclined bars at each side disposed in a vertical plane and secured at their lower ends to the horizontal side bars and secured at their upper ends to each other, guide rails secured respectively to the front inclined bars, a swinging frame including a pair of arms pivoted at their rear ends to the respective horizontal bars and guided in their swinging movement by said guide rails, a scoop carried at the front ends of said swinging arms, means for swinging the arms and scoop upwardly, and releasable means for retaining the arms and scoop in raised position.

4. In a loader, the combination of a relatively stationary frame including substantially horizontal side bars adapted to be secured at opposite sides of a tractor, inclined bars at each side disposed in a vertical plane and secured at their lower ends to the horizontal side bars and secured at their upper ends to each other, guide rails secured respectively to the front inclined bars, a swinging frame including a pair of arms pivoted at their rear ends to the respective horizontal bars and guided in their swinging movement by said guide rails, a scoop carried at the front ends of said swinging arms, cables connected to said swinging arms, drums over which the cables may be wound to lift said arms and scoop, a shaft on which the drums are secured, a driven member rotatably mounted on said shaft, clutch mechanism to operatively connect the driven member to the shaft, manually operable means to connect or disconnect the clutch mechanism, means actuated by the swinging frame, as it reaches its uppermost position, to disengage the clutch mechanism, and releasable means for retaining the swinging arms and scoop in elevated position when the clutch mechanism has been disconnected.

5. In a loader, the combination of a relatively stationary frame including substantially horizontal side bars adapted to be secured at opposite sides of a tractor, inclined bars at each side disposed in a vertical plane and secured at their lower ends to the horizontal side bars and secured at their upper ends to each other, guide rails secured respectively to the front inclined bars, a swinging frame including a pair of arms pivoted at their rear ends to the respective horizontal bars and guided in their swinging movement by said guide rails, a scoop carried at the front ends of said swinging arms, means connected with said swinging arms for raising the same with the scoop, said means including a shaft, a driven member rotatably mounted on the shaft, clutch mechanism to operatively connect the driven member to the shaft, a clutch lever connected with the clutch mechanism to connect or disconnect the same, a hand lever, a link connecting the hand lever with the clutch lever for actuating the latter, a lever pivoted to the upper part of the stationary frame and projecting into the path of the swinging frame, and means automatically operable by the last-mentioned lever, when engaged by the swinging frame, to automatically disconnect the clutch mechanism, and releasable means for retaining the swinging arms and scoop in elevated position when the clutch mechanism has been disconnected.

6. The combination with a tractor comprising a rear axle, a front axle tree, a body portion with an axle housing supported on the rear axle, and a longitudinal pivot bolt connecting the body portion with the front axle tree, of a loader frame, comprising side bars secured at their rear ends to the rear axle housing, a transverse member secured to the front ends of the side bars and disposed underneath the front end of the tractor body and intermediately connected to said pivot bolt, another member secured to the front ends of the side bars and disposed above the tractor body, inclined bars at each side of the frame, said inclined bars being secured at their lower ends to the side bars and secured at their upper ends to each other, guide rails secured respectively to the front inclined bars, a swinging frame including a pair of arms pivoted at their rear ends to the respective side bars and guided in their swinging movement by said guide rails, a scoop carried at the front ends of said swinging arms, means for swinging the arms and scoop upwardly, and releasable means for retaining the arms and scoops in raised position.

7. A material handling attachment for tractors comprising, in combination, a frame supported upon and detachably secured to the axles of the tractor and extending substantially horizontally; substantially upright frame members based upon the horizontal frame and secured together; a pair of arms pivoted at one end to the horizontal frame and projecting beyond one end of the tractor; a material handling member carried by the outer ends of the arms; means on the upright frame for swinging the arms; and means interposed between the pivoted ends of the arms and the stationary frame to take the thrust on said arms when the material handling member is moved against material by travel of the tractor in that direction.

8. The combination with a tractor comprising front and rear walls and a body supported thereby, of a loader frame comprising substantially horizontal side bars secured at opposite sides of the body, inclined bars at each side disposed in a vertical plane and secured at their lower ends to the horizontal side bars and secured at their upper ends to each other, guide rails secured respectively to the front inclined bars, a swinging frame including a pair of arms pivoted at their rear ends to the respective horizontal bars and guided in their swinging movement by said guide rails, said swinging arms overhanging the forward end of the tractor, a scoop carried at the front ends of the swinging arms, means for swinging the arms and scoop upwardly, releasable means for retaining the arms and scoop in raised position, said side bars being extended rearwardly beyond the rear wheels of the tractor, and a counterweight supported by the extended portions of said bars.

9. In a loader, the combination of a relatively stationary main frame, a swinging frame pivoted to the main frame, a scoop carried by the swinging frame, a shaft mounted on the main frame, means operable by the shaft, when rotated, to move the swinging frame upwardly, a constantly driven member on said shaft, a drum keyed to the shaft, a hand lever mounted on the stationary frame, means connected with the hand lever for connecting said drum to the driven member to rotate the shaft and raise the swinging frame, a lever pivoted to the upper part of the main frame and projecting into the path of the swinging frame, means operable by the last-mentioned lever, when engaged by the swinging frame, to automatically disconnect said drum from the driven member, and releasable means for retaining the swinging frame in raised position when said disconnection has been effected.

10. In a loader, the combination of a relatively stationary main frame, a swinging frame pivoted to the main frame, a scoop carried by the swinging frame, a shaft mounted on the main frame, means operable by the shaft, when rotated, to move the swinging frame upwardly, a constantly driven member on said shaft, a drum keyed to the shaft, a hand lever mounted on the stationary frame, means connected with the hand lever for connecting said drum to the driven member to rotate the shaft and raise the swinging frame, means actuated by the swinging frame as it reaches its uppermost position to automatically disengage said drum from the driven member, a brake band encircling said drum, a pedal pivoted on the lowermost part of the main frame, means operable upon depression of the pedal to tighten said brake band to maintain the swinging frame in raised position, a latch cooperating with said pedal to hold the latter depressed, and means adjacent the pedal and operable by the foot to disengage the latch and release the pedal and brake band.

11. The combination with a rotatable shaft and a member keyed to the shaft, of a constantly driven clutch member normally rotatable on the shaft, a clutch band carried by the keyed member, a cam mounted for rocking movement on the keyed member and engageable with the band, and means for actuating said cam to force the band into engagement with the driven clutch member and to hold it there.

12. The combination with a rotatable shaft and a member keyed to the shaft, of a constantly driven clutch member normally rotatable on the shaft, a clutch band carried by the keyed member, a cam mounted for rocking movement on the keyed member, a member slidable on the shaft, means connected with the cam and operable by movement of said slidable member, in one direction, to cause the cam to force the band into engagement with the driven clutch member, and means for controlling the movement of said slidable member.

13. The combination with a rotatable shaft and a member keyed to the shaft, of a constantly driven clutch member normally rotatable on the shaft, a clutch band carried by the keyed member, a cam mounted for rocking movement on the keyed member, a conical member slidable on the shaft, an arm connected with the cam and engageable by the tapered surface of said conical member, when the latter is advanced, to rock said cam and cause it to force the band into engagement with the driven clutch member, and means for controlling the movement of said conical member.

14. The combination with a rotatable shaft and a member keyed to the shaft, of a constantly driven clutch member rotatable on the shaft, a clutch band carried by the keyed member inside the clutch member and having opposed spaced ends, a cam mounted for rocking movement on the keyed member between the ends of said band, a member slidable on the shaft, means connected with the cam and operable by a movement of the slidable member, in one direction, to cause the cam to force the band into engagement with the driven clutch member, and means for controlling the movement of said slidable member.

15. The combination with a rotatable shaft and a member keyed to the shaft, of a constantly driven clutch member normally rotatable on the shaft, a clutch band carried by the keyed member, a cam mounted for rocking movement on the keyed member and engageable with the band, means for actuating said cam to force the band into engagement with the driven clutch member and to hold it there until it is released, a brake band encircling said keyed member, and means for tightening said brake band to hold the shaft stationary when said clutch band is released from engagement with the driven clutch member.

16. In an attachment for tractors, the combination of a main frame including substantially horizontal side bars adapted to be secured at opposite sides of the tractor and inclined bars at each side disposed in a vertical plane and secured at their lower ends to the horizontal side bars and secured at their upper ends to each other, guide rails secured to the front inclined bars, a swinging member including arms pivoted at the rear end to said side bars and extending forwardly of the tractor, earth working elements carried by the forward ends of said arms, said arms being guided on said guide rails as they swing up and down, mechanism operable to swing said arms upwardly, a clutch controlling said mechanism, a manually operable lever for connecting or disconnecting said clutch, an actuating member pivoted on the main frame and projecting into the path of one of the swinging arms, and means connecting said actuating member to the lever to automatically disconnect the clutch when the upwardly swinging arms reach a predetermined position.

17. In an attachment for tractors, the combination of a main frame including substantially horizontal side bars adapted to be secured at opposite sides of the tractor and inclined bars at each side disposed in a vertical plane and secured at their lower ends to the horizontal side bars and secured at their upper ends to each other, guide rails secured to the front inclined bars, a swinging member including arms pivoted at the rear end to said side bars and extending forwardly of the tractor, earth working elements carried by the forward ends of said arms, said arms being guided on said guide rails as they swing up and down, cables connected to the swinging member, drums over which the cables may be wound to swing said member upwardly, a shaft on which the drums are secured, a wheel mounted on said shaft and driven from the tractor engine, a clutch for operatively connecting the wheel to the shaft, a manually operable lever for connecting or disconnecting said clutch, an actuating member pivoted on the main frame and projecting into the path of the swinging member, and means connecting said actuating member to the lever to automatically disconnect the clutch when the upwardly swinging member reaches a predetermined position.

In testimony, that we claim the foregoing as our own, we have hereto affixed our signatures.

HOWARD F. GORSUCH.
ARTHUR SHERIDAN HUGHES.